United States Patent

Takeoka et al.

Patent Number: 5,190,787
Date of Patent: Mar. 2, 1993

[54] PROCESS FOR PRODUCING CONTAINERIZED BEAN CURD

[75] Inventors: Shoichi Takeoka; Isao Kasai, both of Tokushima, Japan

[73] Assignee: Shikoku Kakoki Co., Ltd., Tokushima, Japan

[21] Appl. No.: 696,427

[22] Filed: May 6, 1991

[30] Foreign Application Priority Data

May 9, 1990 [JP]  Japan ................................. 2-120578

[51] Int. Cl.⁵ .............................................. A23L 1/20
[52] U.S. Cl. .................................... 426/634; 426/573; 426/656
[58] Field of Search .......................... 426/573, 634, 656

[56] References Cited

U.S. PATENT DOCUMENTS 4,826,701  5/1989  Joo et al. ............................... 426/634

Primary Examiner—Jeanette Hunter
Assistant Examiner—Helen Pratt
Attorney, Agent, or Firm—Armstrong, Westerman, Hattori, McLeland & Naughton

[57] ABSTRACT

A process for producing bean curd as placed in containers by heat-sterilizing an amount of soybean milk sufficient to prepare one lot of bean curd, storing the sterilized milk in a heat-insulating tank while cooling the milk at a temperature of up to 10° C., admixing a coagulant with the milk as delivered from the tank, filling the mixture into containers, sealing off the containers, and heating the sealed containers to coagulate the mixture within the containers. The process is characterized in that the soybean milk delivered from the tank is preheated to a temperature of 18° to 30° C. before the coagulant is admixed with the milk.

6 Claims, 1 Drawing Sheet

PROCESS FOR PRODUCING CONTAINERIZED BEAN CURD

BACKGROUND OF THE INVENTION

The present invention relates to a process for producing bean curd as placed in containers.

Such a process is known which comprises heat-sterilizing an amount of soybean milk sufficient for preparing one lot of bean curd, storing the sterilized milk in a heat-insulating tank while cooling the milk at a temperature of up to 10° C., admixing a coagulant with the milk as delivered from the tank, filling the mixture into containers, sealing off the containers, and heating the sealed containers to coagulate the mixture within the containers.

In the above process, the soybean milk is cooled to a temperature of up to 10° C. because if the temperature exceeds 10° C., the milk becomes impaired in flavor and quality. However, when the milk having a temperature of up to 10° C. and drawn off from the tank is to be coagulated with the coagulant admixed therewith, it is likely that the milk will not coagulate smoothly and uniformly, while the bean curd obtained is not smoothly releasable from the container. Thus, the process has the problem that when to be withdrawn from the container, the bean curd partly remains adhered to the container and is not withdrawable therefrom smoothly.

SUMMARY OF THE INVENTION

The main object of the present invention is to overcome the above problem and to provide bean curd which is prepared as placed in containers and has a satisfactory quality free from deterioration and coagulation irregularities and which is nevertheless smoothly releasable from the container.

The process of the present invention for producing bean curd as placed in containers comprises the steps of the conventional process described above and is characterized in that before the coagulant is admixed with the soybean milk delivered from the heat-insulating tank, the milk is preheated to a temperature of 18° to 30° C.

With the process of the present invention, the soybean milk drawn off from the heat-insulating tank is preheated to 18° to 30° C. before the coagulant is admixed therewith, so that coagulation proceeds at a suitable velocity and produces a suitable amount of released water during the coagulation. Consequently, the bean curd prepared as placed in containers is readily releasable from the container.

DESCRIPTION OF THE PREFERRED EMBODIMENT

Figure 1:
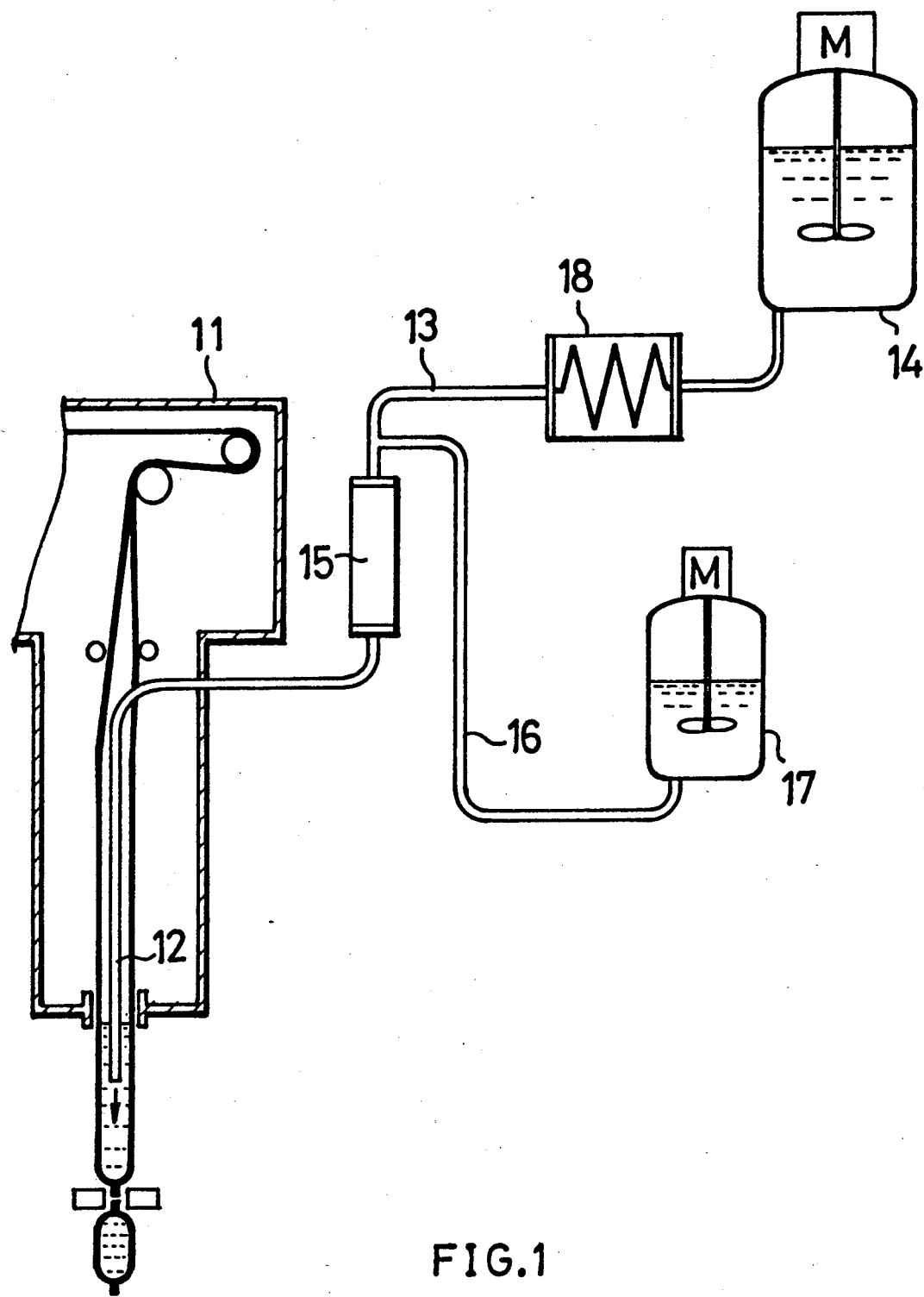
FIG. 1 is a diagram showing the construction of a bean curd production machine for use in practicing the process of the invention.

An embodiment of the present invention will be described below with reference to the drawing.

FIG. 1 shows a bean curd production machine for use in practicing the present invention.

The machine comprises a filling device 12 disposed within an aseptic chamber 11, an aseptic soybean milk tank 14 having a stirrer and connected to the filling device 12 by a primary pipe 13, a pipe mixer 15 mounted on the primary pipe 13 and proximate to the filling device 12, an aseptic coagulant tank 17 having a stirrer and connected to the mixer 15 by a secondary pipe 16, and a preheating heat exchanger 18 provided on the primary pipe 13 and positioned between the milk tank 14 and the mixer 15.

The aseptic chamber 11 serves to separate off a required packaging work space and holds an aseptic atmosphere therein.

Although not shown in detail, the filling device forms a web serving as a packaging material into a tube, filling a mixture of soybean milk and a coagulant into the tube, cutting the filled tube in lengths each corresponding to a container to prepare pillow-shaped intermediate containers, and finally making the intermediate containers into rectangular parallelepipedal containers. Although not shown, the web is a paper-base laminate which comprises a polyethylene layer, paper layer, adhesive layer, aluminum foil layer and polyethylene layer as laminated to one another.

Soybean milk prepared by the usual method and having a Brix concentration of 10 to 15% is sterilized and then cooled by being passed through unillustrated heating heat exchanger and cooling heat exchanger and thereafter stored in the milk tank 14. The tank 14 has a capacity, for example of 1000 liters. Assuming that the amount of soybean milk corresponding to a piece of bean curd is 300 ml, 10,000 pieces of bean curd are prepared at a time from the milk supplied from the tank 14. The milk is heated to a temperature of at least 125° C. and then cooled to a temperature of up to 10° C., preferably 4° to 10° C., optimally 7° C. If the temperature is below 4° C., the milk is likely to freeze, whereas if the temperature exceeds 10° C., the milk is liable to permit growth of microorganisms. The milk tank 14 is equipped with an unillustrated cooler, which maintains the milk at the specified cooling temperature inside the tank 14.

The coagulant tank 17 has stored therein an aqueous solution, having a Brix concentration of 8 to 25%, of magnesium chloride with a purity of at least 90%, preferably 99.5%, after the solution has been sterilized with heating and subsequently cooled like the soybean milk. The solution, however, is cooled to a temperature of 20° C. Calcium sulfate may be used in place of magnesium chloride.

The soybean milk to be supplied from the milk tank 14 to the filling device 12 via the primary pipe 13 is passed through the preheating heat-exchanger 18 disposed on an intermediate portion of the pipe 13. The milk, when having a temperature of 7° C., is preheated to about 25° C. by being passed through the heat exchanger 18 in the case where the heat medium used for the heat exchanger 18 is hot water having a temperature of 28° C.

When the coagulant is supplied from the tank 17 to the mixer 15 through the secondary pipe 16, the coagulant is admixed with the preheated soybean milk, whereupon the mixture is fed to the filling device 12 and filled into containers and sealed off within the aseptic chamber 11.

The sealed containers are discharged from the aseptic chamber 11 and immersed in a hot water bath (not shown), in which the containers are heated at 80° C., preferably at 96° C., for 30 minutes, whereby the mixture in the containers is coagulated to give fine-textured bean curd.

Table 1 collectively shows the results obtained by preheating the soybean milk at varying temperatures of 14° to 35° C. and checking the resulting bean curd for releasability from the container to determine the acceptability of the product. Two kinds of coagulants were used which are magnesium chloride and calcium sulfate. Table 1 reveals that when the preheating temperature is 18° to 30° C., the bean curd is smoothly releasable from the container. Temperatures below 18° C. result in poor releasability, whereas if the temperature exceeds 30° C., the bean curd is smoothly releasable from the container, but the presence of an excess of released water renders the product commercially unacceptable.

Although the packaging material used in the above embodiment is a web, traylike containers and closures may alternatively be used. Preferably, both the container and the closure are made of a material, such as polypropylene, having gas barrier properties.

TABLE 1

| Preheating temp. °C. | 14 | 15 | 16 | 17 | 18 | 19 | 20 | *** | 29 | 30 | 31 | 32 | 33 | 34 | 35 |
|---|---|---|---|---|---|---|---|---|---|---|---|---|---|---|---|
| Magnesium chloride | B | B | B | B | A | A | A | | A | A | C | C | C | C | C |
| Calcium sulfate | B | B | B | B | A | A | A | | A | A | C | C | C | C | C |

A: Good releasability of bean curd from container
B: Poor releasability of bean curd from container
C: Excess of released water to render bean curd commercially unacceptable

What is claimed is:

1. A process for producing containerized bean curd comprising the steps of:

heat-sterilizing an amount of bean milk sufficient to prepare one lot of bean curd;

storing the sterilized milk in a heat-insulating tank while cooling the milk to a temperature of at most 10° C.;

delivering the milk from the heat-insulating tank to a mixer;

pre-heating the milk to a temperature of between 18° C. and 30° C. while the milk is being delivered from the heat-insulating tank to the mixer for mixing with the coagulant;

admixing a coagulant with the milk as delivered from the tank, the coagulant being mixed with the milk in the mixer;

filling the mixture into containers, sealing off the containers, and heating the sealed containers to coagulate the mixture within the containers.

2. A process as defined in claim 1 wherein the soybean milk is stored in the heat-insulating tank at a temperature of not lower than 4° C.

3. A process as defined in claim 1 wherein the soybean milk has a Brix concentration of 10 to 15%.

4. A process as defined in claim 1 wherein the coagulant is magnesium chloride or calcium sulfate having a purity of at least 95%.

5. A process as defined in claim 1 wherein the coagulant is admixed with the soybean milk by a pipe mixer, the soybean milk is fed from the heat-insulating tank to the pipe mixer through a primary pipe, and the coagulant is fed from a coagulant tank to the pipe mixer through a secondary pipe.

6. A process as defined in claim 1 wherein the soybean milk is preheated by a heat exchanger using hot water as a heat medium.

* * * * *